United States Patent
Share et al.

(10) Patent No.: US 7,807,270 B2
(45) Date of Patent: Oct. 5, 2010

(54) MULTILAYERED PACKAGE WITH BARRIER PROPERTIES

(75) Inventors: Paul E. Share, Wexford, PA (US); Keith R. Pillage, Pittsburgh, PA (US)

(73) Assignee: Valspar Sourcing, Inc., Minneapolis, MN (US)

( * ) Notice: Subject to any disclaimer, the term of this patent is extended or adjusted under 35 U.S.C. 154(b) by 113 days.

(21) Appl. No.: 10/416,135

(22) PCT Filed: Oct. 31, 2001

(86) PCT No.: PCT/US01/46050
§ 371 (c)(1), (2), (4) Date: Nov. 17, 2003

(87) PCT Pub. No.: WO02/38674
PCT Pub. Date: May 16, 2002

(65) Prior Publication Data
US 2004/0074904 A1    Apr. 22, 2004

(51) Int. Cl.
*B32B 7/08*     (2006.01)
*B32B 27/34*    (2006.01)
*B29D 23/00*    (2006.01)

(52) U.S. Cl. .............. 428/474.4; 428/475.2; 428/542.8; 428/36.7; 428/36.6; 428/35.7; 428/36.91; 215/12.2

(58) Field of Classification Search ................. 428/36.6, 428/36.7, 474.4, 475.2, 542.8, 480, 35.7, 428/36.91; 215/12.1, 12.2
See application file for complete search history.

(56) References Cited

U.S. PATENT DOCUMENTS

| 4,284,671 | A |   | 8/1981 | Cancio et al. ............... 428/36.6 |
| 4,501,781 | A |   | 2/1985 | Kushida et al. ............. 215/12.2 |
| 4,613,644 | A | * | 9/1986 | Moritani et al. ............. 524/430 |
| 4,764,403 | A |   | 8/1988 | Ajmera ....................... 428/36.7 |
| 4,952,628 | A |   | 8/1990 | Blatz ........................... 525/58 |

(Continued)

FOREIGN PATENT DOCUMENTS

EP     0 191 701     8/1986

(Continued)

OTHER PUBLICATIONS

The supplementary European search report for corresponding European patent application No. 06 02 0141.5, dated Jan. 16, 2007 (4 pages).

*Primary Examiner*—Patricia L Nordmeyer
(74) *Attorney, Agent, or Firm*—Shumaker & Sieffert, P.A.

(57) ABSTRACT

The present invention provides compositions useful as a barrier layer in, for example, packaging products. The compositions generally comprise a blend of (i) a polyester material, preferably an aromatic polyester resin such as polyethylene terephthalate (PET) and (ii) a vinyl alcohol material. The blend optionally may further comprise (iii) a polyolefin material (preferably a functionalized polyolefin material, e.g., a BYNEL material); and/or (iv) a polyamide material (preferably an amorphous polyamide material, e.g., a GRIVORY material), that optionally further comprises an oxygen scavenging material. The present invention also provides containers (e.g., containers formed by expansion of preforms) having a multilayered body-forming portion including: a core layer comprising the aforementioned blend, and inner and outer layers of a formable polymer composition. The present invention also provides methods of making such containers.

29 Claims, 3 Drawing Sheets

U.S. PATENT DOCUMENTS

| | | | |
|---|---|---|---|
| 4,971,864 A | 11/1990 | McCord | 428/516 |
| 5,034,252 A | 7/1991 | Nilsson et al. | 428/35.8 |
| 5,068,136 A | 11/1991 | Yoshida et al. | |
| 5,069,946 A | 12/1991 | Moritani et al. | 428/36.8 |
| 5,077,111 A | 12/1991 | Collette | 428/36.7 |
| 5,110,855 A | 5/1992 | Blatz | 524/441 |
| 5,194,306 A | 3/1993 | Blatz | 428/35.4 |
| 5,281,360 A | 1/1994 | Hong et al. | 252/188.28 |
| 5,641,825 A | 6/1997 | Bacskai et al. | 524/398 |
| 5,759,653 A | 6/1998 | Collette et al. | 428/35.9 |
| 5,866,649 A | 2/1999 | Hong et al. | |
| 6,423,776 B1 | 7/2002 | Akkapeddi et al. | |
| 6,759,107 B1 * | 7/2004 | Tai et al. | 428/36.4 |
| 6,777,479 B1 | 8/2004 | Bernard et al. | |
| 2002/0022099 A1 | 2/2002 | Schmidt et al. | |

FOREIGN PATENT DOCUMENTS

| | | |
|---|---|---|
| EP | 0 191 701 A2 | 8/1986 |
| EP | 0 703 279 A1 | 3/1996 |
| EP | 1 348 006 B1 | 9/1996 |
| JP | 58197050 | 11/1983 |
| JP | 200006939 | 1/2000 |
| WO | 95/11801 | 5/1995 |
| WO | WO 95/11801 | 5/1995 |

* cited by examiner

MULTILAYERED PACKAGE WITH BARRIER PROPERTIES

BACKGROUND

Within the packaging industry, there is a progressive change towards the use of containers of plastic material. This relates to both containers for beverages, including carbonated beverages, and containers for foods. As far as foods are concerned, there is an express desire in the art also to be able to employ containers of plastic material for the storage of preserved foods. In all of these fields of application, the insufficient barrier properties of the plastic material—and in particular its insufficient capacity to prevent the passage of gases, for example oxygen and $CO_2$, vaporized liquids such as water vapor etc. entail that the shelf-life and durability of the products stored in the containers will be far too short.

A number of proposals have been put forward in the art to solve the above problem, but the proposed techniques have failed to meet established demands of cost in combination with barrier properties in order that containers of plastic material may successfully be employed within the above-outlined sectors. Examples of solutions proposed in the art include:

- laminates in which two or more layers of plastic material are combined with one another and in which the material in each layer possesses properties which entail that, for instance, gas penetration, light penetration or moisture penetration are reduced;
- constructions in which, for example, a metal such as aluminum is encapsulated between the plastic materials or, for instance, forms the inner surface of the container; and
- constructions in which a barrier material other than metal is applied interiorly or in layers between the plastic material.

Solutions are also known in the art in which plastic materials of different types are mixed and thereafter molded to form containers. Thus, for example, it is previously known to produce containers of plastic material in which the plastic material consists of a mixture of polyethylene terephthalate (PET) and polyamide. See, e.g., U.S. Pat. Nos. 5,034,252; 5,281,360; 5,641,825; and 5,759,653. It is also previously known to produce containers of plastic material in which the plastic material consists of a mixture containing EVOH. See, e.g., U.S. Pat. Nos. 4,952,628; 5,194,306; 5,110,855; 5,069,946; and 4,971,864. Unfortunately, these attempts have yielded commercially unsatisfactory results.

Barrier layers that consist essentially of EVOH have also been tried for bottle applications. These attempts, unfortunately, suffer from several disadvantages. For example, barrier layers made from pure EVOH are relatively expensive (typically the cost for EVOH is about three times that for PET). In addition, the adhesion of a pure EVOH barrier layer to adjacent PET layers is quite poor. Moreover, it is known that EVOH barriers are quite moisture sensitive (e.g., at low humidity the barrier properties of EVOH are good, while at high humidity the barrier properties degrade substantially). Consequently, EVOH barriers have not achieved widespread commercial acceptance for bottle applications.

From the foregoing, it will be appreciated that what is needed in the art is improved plastic containers having even greater barrier properties for gases such as oxygen and $CO_2$. Such containers and materials and methods for preparing the same are disclosed and claimed herein.

RELATED APPLICATIONS

Of related interest is the following U.S. patent application, filed by the assignee of this invention: Multilayered Package with Barrier Properties, Ser. No. 60/246,834, which is herein incorporated by reference.

SUMMARY

The present invention relates to compositions useful as a barrier layer in, for example, packaging products. The compositions generally comprise a blend of (i) a polyester material, preferably an aromatic polyester resin such as PET and (ii) a vinyl alcohol material, preferably an ethylene vinyl alcohol copolymer material (EVOH). The blend optionally may further comprise (iii) a polyolefin material (preferably a functionalized polyolefin material, e.g., a BYNEL material); and/or (iv) a polyamide material (preferably an amorphous polyamide material, e.g., a GRIVORY material), that optionally further comprises an oxygen scavenging material.

The present invention also relates to containers (e.g., containers formed by expansion of preforms) having a multilayered body-forming portion including: a core layer comprising the aforementioned blend; and inner and outer layers of a formable polymer composition. The present invention also relates to methods of making such containers.

DETAILED DESCRIPTION

In one embodiment, the present invention relates to compositions useful as a barrier layer in, for example, packaging products. The compositions of this embodiment generally comprise a blend (i) a polyester material, preferably an aromatic polyester resin such as PET and (ii) a vinyl alcohol material, preferably an ethylene vinyl alcohol copolymer material (EVOH). The blend optionally may further comprise (iii) a polyolefin material (preferably a functionalized polyolefin material, e.g., a BYNEL material); and/or (iv) a polyamide material (preferably an amorphous polyamide material, e.g., a GRIVORY material), that optionally further comprises an oxygen scavenging material.

Suitable polyester materials for use in the present invention include PET (e.g., virgin bottle grade PET, post-consumer PET (PC-PET), etc.), cyclohexane dimethanol/PET copolymer (PETG), polyethylene naphthalate (PEN), polybutylene terephthalate (PBT), etc.

Phthalic acid polyesters based on terephthalic or isophthalic acid are commercially available and convenient. Suitable hydroxy compounds for these polymers typically includes ethylene glycol, propylene glycol, butylene glycol and 1,4-di-(hydroxy methyl)cyclohexane.

Suitable polyesters for use in the present invention typically have an intrinsic viscosity in the range of 0.6 to 1.2, and more particularly 0.7 to 1.0 (for a 60/40 blend of phenol/tetrachloroethane solvent). For PET an intrinsic viscosity value of 0.6 corresponds approximately to a viscosity average molecular weight of 36,000, and an intrinsic viscosity value of 1.2 to a viscosity average molecular weight of 103,000.

In general, suitable polyesters may include polymer linkages, side chains, and end groups not related to the formal precursors of the simple polyesters previously specified.

Suitable vinyl alcohol materials for use in the present invention include, for example, ethylene vinyl copolymers having a copolymerized ethylene content of between about 0 and 80 mole %, preferably between about 20 and 60 mole %, and more preferably between about 25 and 50 mole %. Copolymers of less than about 15 mole % ethylene tend to be difficult to process without plasticizer, while those having above 65 mole % ethylene have reduced oxygen barrier performance. Preferred copolymers have a saponification degree of at least about 90%, more preferably at least about 95%. The blend preferably comprises an ethylene vinyl alcohol copolymer material (EVOH).

The vinyl alcohol polymer may include as other comonomers other olefins such as propylene, butylene, butene-1, pentene-1, or 4-methylenepentene-1, unsaturated carboxylic acids or esters (e.g., methacrylic acid, acrylic acid, maleic acid, fumaric acid, itaconic acid, higher fatty acid vinyl esters, alkylvinyl ethers), vinyl silane compounds (e.g., vinyltrialkoxysilane), and vinylpyrrolidone (e.g., N-vinylpyrrolidone). Typically the amount of other comonomers will be up to about 5 mole % or less, based on the total copolymer. It is generally observed that the higher the vinyl alcohol content of the resin, the better the barrier properties at low humidity, but the poorer the barrier properties at high humidity.

The melting point of ethylene vinyl alcohol polymers having at least about 20 mole % copolymerized ethylene are generally between about 160 and 190° C.

Ethylene vinyl alcohol polymers are normally prepared by copolymerization of ethylene with vinyl acetate, followed by hydrolysis of the vinyl acetate component to give the vinyl alcohol group. Normally there will be less than about 3 weight % of vinyl acetate after the hydrolysis process, and preferably less than 1.5 weight percent. The vinyl alcohol material may be blended with plasticizers, thermal stabilizers, ultraviolet absorbers, antioxidants, colorants, fillers and other resins.

Suitable vinyl alcohol polymers for use in this invention have a melt index of between about 20 to 1, preferably between about 15 to 1.5, more preferably between about 13 to 8, and most preferably between about 12 to 10 (as determined in accordance with ASTM Test D-1238). Typically, suitable copolymers have densities of about 1.1 to 1.2, and their melting points will normally range from about 160 to 190° C.

Suitable commercially available EVOH copolymers for use in the present invention include, for example, the commercially available materials listed in the following table:

| EVOH | % Ethlene | Melt Index | Manufacturer |
| --- | --- | --- | --- |
| EP-F104BW | 32 | 10.5 | Evalca |
| LC-F101BZ | 32 | 3.8 | Evalca |
| LC-E105A | 44 | 13.0 | Evalca |
| LC-E151B | 44 | 3.5 | Evalca |

-continued

| EVOH | % Ethlene | Melt Index | Manufacturer |
| --- | --- | --- | --- |
| SOARNOL D2908 | 29 | 8 | Soarus |
| SOARNOL DC3212B | 32 | 12 | Soarus |
| SOARNOL A4412 | 44 | 12 | Soarus |

Presently preferred EVOH copolymers include: EP-F104BW and SOARNOL DC3212B.

The proportion of vinyl alcohol material in relation to polyester can be varied mainly in view of the intended use of the container.

In one embodiment of the present invention, the composition comprises a blend of a polyester material and a vinyl alcohol material, wherein the blend preferably comprises less than 55% by weight of the vinyl alcohol material. For this embodiment, the blend more preferably comprises between 20 and 55%, and most preferably between 40 and 55% by weight vinyl alcohol material. Also for this embodiment, the blend more preferably comprises between 20 and 80%, and most preferably between 30 and 70% by weight polyester material.

In another embodiment of the present invention, the composition comprises a blend of a polyester, a vinyl alcohol material and a functionalized polyolefin material (e.g., a BYNEL material). For this embodiment, the blend preferably comprises between 20 and 70%, more preferably between 25 and 60%, and most preferably between 25 and 55% by weight vinyl alcohol material. Also for this embodiment, the blend preferably comprises between 20 and 80%, and more preferably between 30 and 70% by weight polyester. Also for this embodiment, the blend preferably comprises up to about 25%, more preferably between 0.5 and 20%, and most preferably between 1 and 10% by weight polyolefin material (preferably functionalized polyolefin material).

As previously mentioned, the blend may optionally comprise a polyolefin material. Suitable polyolefin materials for use in the present invention include HDPE, LDPE, PP, etc. Preferred such polyolefin materials are functionalized (e.g., maleic anhydride functional) so as to be compatible with the polyester material and the vinyl alcohol material.

Suitable commercially available functionalized polyolefins for use in the present invention include, for example, the commercially available materials listed in the following table:

| Functionalized Polyolefin | Olefin | Melt Index | % Maleic Anhydride | Manufacturer |
| --- | --- | --- | --- | --- |
| Bynel 4006 | HDPE | 0.6 | 0.14 | DuPont |
| Bynel 4033 | HDPE | 2.0 | 1.00 | DuPont |
| Bynel 4104 | LLDPE | 1.1 | 0.11 | DuPont |
| Bynel 4140 | LLDPE | 1.5 | 1.00 | DuPont |
| Orevac 18302 | LLDPE | 1.0 | | Atofina |
| Orevac 18302 | LLDPE | 1.0 | | Atofina |
| Admer QF500A | PP | 3.0 | | Mitsui Chemicals |

The amount of optional polyolefin (preferably functionalized polyolefin) in the blend may be varied according to a variety of factors. In preferred embodiments the blend comprises less than about 25% by weight polyolefin, more preferably less than about 20% by weight.

If desired, the blend may optionally comprise a polyamide material optionally further comprising an oxygen scavenging material. While not intending to be bound by theory, it is believed that suitable oxygen scavenging materials form active metal complexes having capacity to bond with oxygen. In this manner, it is believed that the oxygen scavenging material can confer higher oxygen barrier properties to the composition.

Suitable polyamide materials include aromatic and aliphatic polyamides. Copolymers of polyamides and other polymers may also be used. Most preferably used in the blends of the present invention are amorphous polyamides. By "amorphous polyamide" is meant polymers distinct from the crystalline or semicrystalline nylons. Nylon 6, 9, 11, and 12, for example, are crystalline polymers and have readily determined crystalline melting points. In contrast, the preferred "amorphous polyamides" useful in the present invention lack an endotherm crystalline melting peak in a DSC test. Examples of suitable amorphous polyamide materials are disclosed in U.S. Pat. No. 4,952,628, the disclosure of which are herein incorporated by reference.

Suitable polyamides include amorphous polymers prepared from the following diamines: hexamethylenediamine, 2-methylpentamethylenediamine, 2,2,4-trimethylhexamethylenediamine, 2,4,4-trimethylhexamethylenediamine, bis(4-aminocyclohexyl)methane, 2,2-bis(4-aminocyclohexyl)isopropylidine, 1,4-diaminocyclohexane, 1,3-diaminocyclohexane, meta-xylylenediamine, 1,5-diaminopentane, 1,4-diaminobutane, 1,3-diaminopropane, 2-ethyldiminobutane, 1,4-diaminomethylcyclohexane, p-xylylenediamine, m-phenylenediamine, p-phenylenediamine, and alkyl substituted m-phenylenediamine and p-phenylenediamine.

Suitable commercially available polyamides include, for example, GRIVORY (e.g., GRIVORY G16, G21, which are copolyamides having both linear aliphatic units and ring-like aromatic components, available from EMS-Chemie Inc.) and VERSAMID (an aliphatic polyamide typically used as an ink resin and available from Cognis Corporation).

The polyamide material optionally may be used with a suitable oxygen scavenging material. A broad variety of metallic and organic compounds are believed to be effective in providing the oxygen scavenging effect, and an appropriate compound may be selected based on cost and compatibility with the polymers of the blend. A preferred embodiment is a transition metal or a complex of metals selected from the first, second and third transition series of the periodic table, such as iron, cobalt, nickel, ruthenium, rhodium, palladium, osmium, iridium, and platinum. In another preferred embodiment, the metal compound comprises copper, manganese, or zinc. Suitable oxygen scavenging materials for use in this invention include: aluminum powder; aluminum carbide; aluminum chloride; cobalt powder; cobalt oxide; cobalt chloride; antimony powder; antimony oxide; antimony tri-acetate, antimony chloride III; antimony chloride V; iron; electrolytic iron; iron oxide; platinum; platinum on alumina; palladium; palladium on alumina; ruthenium; rhodium; copper; copper oxide; nickel, and mixed metal nanoparticles (e.g., cobalt iron oxide nanoparticles). Suitable nanoparticles have an average particle size of less than about 200 nm, preferably less than about 100 nm, and more preferably between 5 and 50 nm.

While not intending to be bound by theory, it is presently believed that one possible advantage mixed metal nanoparticles might have is that cobalt ferrite undergoes an internal charge transfer from cobalt to iron under the illumination of a tungsten halogen lamp. As part of the commercial bottle blowing process, preforms are sometimes heated under direct irradiation of quartz halogen lamps. Although cobalt ferrite-type scavengers may absorb oxygen upon formation with the polyamide, it is anticipated that the scavenging activity would be substantially increased as a result of the intense illumination during bottle formation. In addition, cobalt ferrite nanoparticles are prepared as a nanocrystalline material. It is expected that the nanometer scale of the particles may render them suitable for use in colorless, optically transparent containers, and that their crystalline structure would give rise to higher activity than solution salts of the same ions.

One skilled in the art can determine without much difficulty which concentration is appropriate in each blend, but in general it will be a range of 50-10,000 ppm by weight, and more preferably 50-1,000 ppm. The upper limit is dictated by factors such as economy, toxicity, clarity and color.

There are numerous multilayer preform and container constructions possible, each of which may be adapted for a particular product and/or manufacturing process. A few representative examples will be given.

A suitable three-layer construction comprises a core barrier layer disposed between inner and outer layers. For example, the three-layer sidewall construction may comprise inner and outer layers of polyester material (e.g., substantially virgin PET); and a core layer including a blend of (i) one or more polyesters (e.g., PET, PC-PET, PETG, PEN, PBT), and (ii) a vinyl alcohol material (e.g., EVOH). The blend may optionally comprise (iii) a polyolefin material (preferably a functionalized polyolefin material); and/or (iv) a polyamide material (preferably an amorphous polyamide material), that optionally further comprises an oxygen scavenging material.

A suitable five-layer structure may have relatively thin inner and outer intermediate layers to provide high oxygen barrier properties without loss of clarity. Relatively thicker inner and outer layers of polyester material (e.g., PET) would provide the necessary strength and clarity. A thin core layer as described above provides the necessary barrier effect at a competitive price and with accelerated activation. Suitable inner and outer intermediate layers for this embodiment may comprise oxygen barrier layers such as EVOH, PEN, polyvinylidene chloride (PVDC), nylon 6, MXD-6, LCP (liquid crystal polymer), amorphous nylon, polyacrylonitrile (PAN), styrene acrylonitrile (SAN), and active scavengers such as AMOSORB from BP/AMOCO.

An alternative five-layer structure may have inner and outer layers of PET, inner and outer intermediate layers of PC-PET, and a thin core layer as described above. The advantage of this embodiment is that the PC-PET may be effectively encapsulated in the bottle and not come in direct contact with the product or the user.

In preferred embodiments, the core layer has a thickness of between about 1 and 10, more preferably between about 2 and 8, and most preferably between about 3 and 6 percent of the total wall thickness.

The container of the present invention may be used to provide good gas (e.g., oxygen and/or $CO_2$) barrier properties for products such as carbonated soft drinks. It is particularly useful in packaging products such as beer, because beer rapidly loses its flavor due to oxygen migration into the bottle. This is also true for products such as citrus products, tomato-based products, and aseptically packaged meat.

In preferred embodiments, the blends of the present invention, when formed into three-layer (PET-Blend-PET), ten-ounce (295 ml) beverage bottles having a total wall thickness of 0.051 cm and a core layer of 5% of the total wall thickness, exhibit less than 15% loss of $CO_2$, when tested as described in Examples 1-3, over a 7.5 week period. More preferably the loss of $CO_2$ over that same period is less than 12% and most preferably is less than 10%.

In preferred embodiments, the blends of the present invention, when formed into three-layer (PET-Blend-PET), ten-ounce (295 ml) beverage bottles having a total wall thickness of 0.051 cm and a core layer of 5% of the total wall thickness, exhibit less than 0.02 cc/pkg/day transmission of $O_2$, when tested as described in Examples 1-3. More preferably the transmission of $O_2$ over that same period is less than 0.01 cc/pkg/day, and most preferably is less than 0.005 cc/pkg/day.

Figure 1:
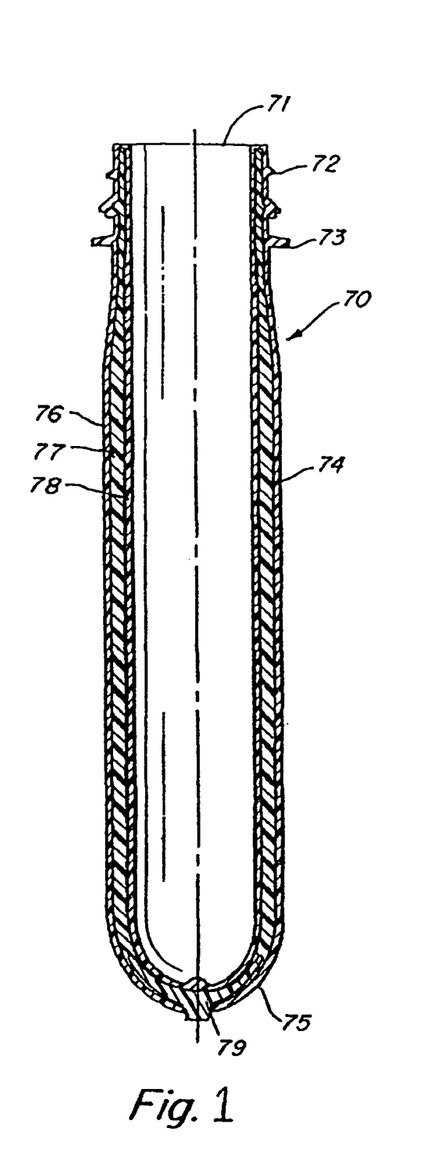
FIG. 1 is a cross-sectional view of a three-layer preform according to this invention.
Figure 2:
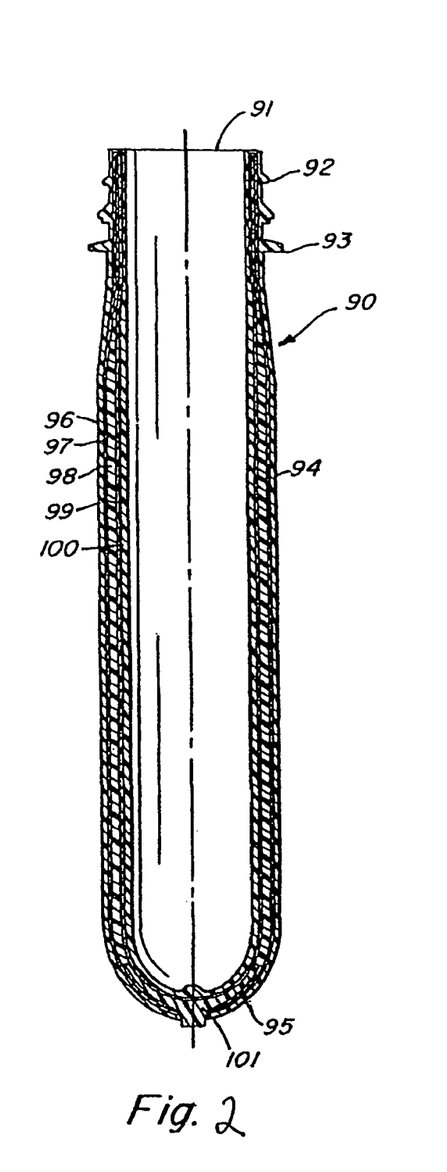
FIG. 2 is a cross-sectional view of a five-layer preform according to this invention.

FIGS. 1-2 show two alternative multi-layer preform structures, and FIGS. 3-6 show two alternative container structures, useful in the present invention.

FIG. 1 shows a substantially amorphous and transparent three-layer preform 70 having an open upper end 71 with a neck finish including outer threads 72 and a cylindrical flange 73. Below the neck flange there is a substantially cylindrical body portion 74, terminating in a closed hemispherical bottom end 75.

The three-layer sidewall construction includes outer layer 76, core layer 77, and inner layer 78. By way of example, the inner and outer (exterior) layers (78 and 76) may be virgin bottle grade PET, while the core layer 77 comprises the blend composition of this invention. In a lower base-forming portion of the preform, a five-layer structure may optionally be formed by a last shot of virgin PET that clears the injection nozzle of the blend composition (so it is filled with virgin PET for preparation of the next preform). The last shot 79 of virgin PET forms a five-layer structure around the gate, and in this case the virgin PET extends through to the exterior of the preform at the gate region. The dimensions and wall thicknesses of the preform shown in FIG. 1 are not to scale. Any number of different preform constructions may be used.

Figure 3:
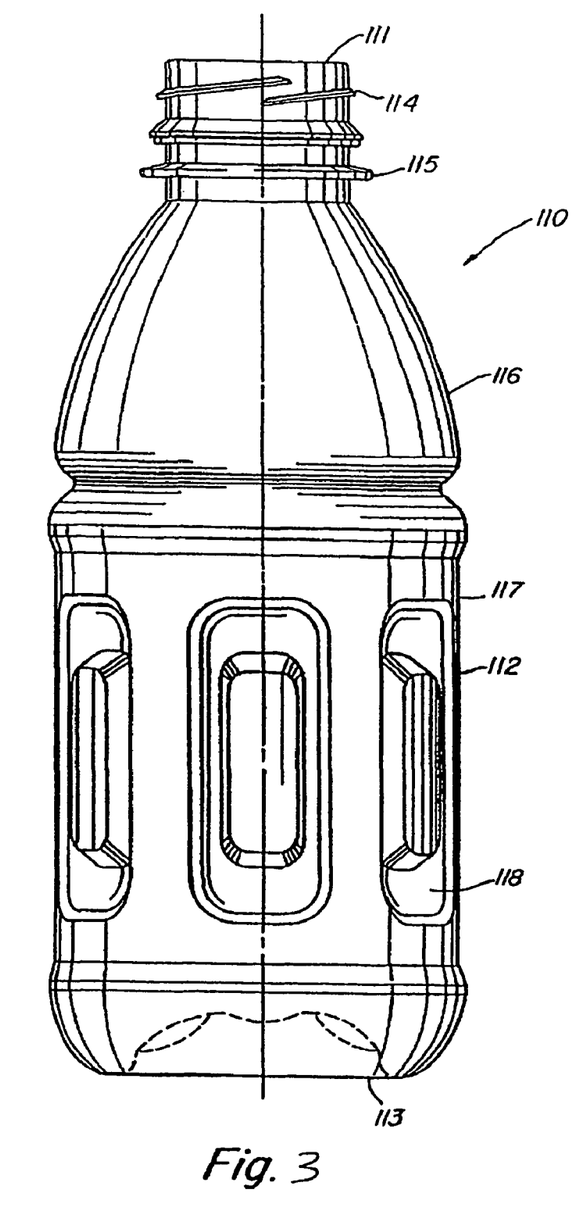
FIG. 3 is an elevational view of a three-layer hot-fill container according to this invention.
Figure 4:
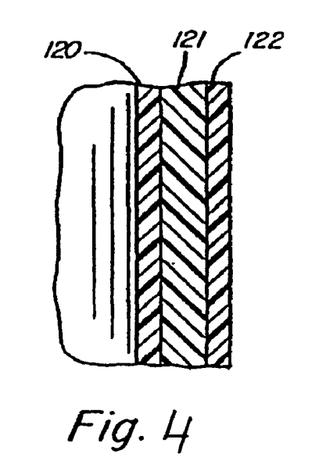
FIG. 4 is an enlarged fragmentary sectional view taken through the sidewall of the container of FIG. 3, showing the three-layers.

FIGS. 3-4 show a representative three-layer, container that may be blow molded from a preform similar to that shown in FIG. 1. The container 110 includes an open top end 111, substantially cylindrical sidewall 112, and closed bottom end 113. The container includes the same neck finish 114 and flange 115 of the preform, which are not expanded during blow molding. The sidewall includes an expanded shoulder portion 116 increasing in diameter to a cylindrical panel portion 117, which includes a plurality of vertically-elongated, symmetrically-disposed vacuum panels 118. The vacuum panels are designed to move inwardly to alleviate the vacuum formed during product cooling in the sealed container. Again, this container construction is by way of example only and the invention is not limited to any particular package structure. FIG. 4 shows the three-layer sidewall construction including inner layer 120, core layer 121, and outer layer 122. By way of example, the inner and outer layers (120 and 122) may be virgin bottle grade PET, while the core layer 121 is made of the blend composition of this invention.

FIG. 2 shows an alternative five-layer preform 90. Again, the preform includes an open upper end 91, neck finish with threads 92 and flange 93, and body-forming portion 94 with a closed bottom end 95. The five-layer sidewall construction includes outer layer 96, first intermediate layer 97, core layer 98, second intermediate layer 99, and inner layer 100, disposed in serial order. By way of example, the inner and outer layers 96 and 100 may be virgin bottle grade PET, while the intermediate layers 97 and 99 are a PC-PET material or a high oxygen barrier material such as EVOH, and the core layer 98 is made of the blend composition of this invention. Again in the base, there optionally may be a last shot of virgin PET 101 to clear the nozzle.

Figure 5:
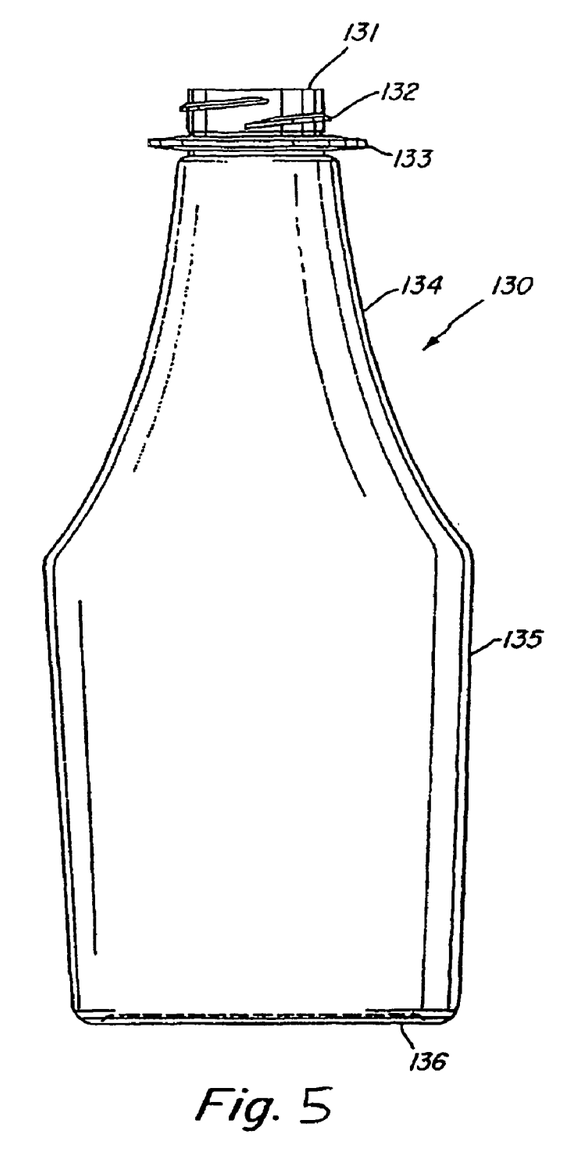
FIG. 5 is an elevational view of a five-layer ketchup container according to this invention.
Figure 6:
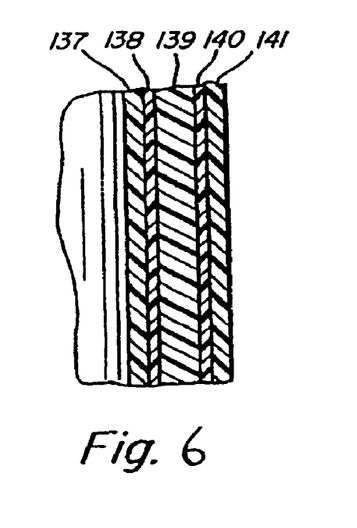
FIG. 6 is an enlarged fragmentary sectional view taken through the sidewall of the container of FIG. 5, showing the five layers.

FIGS. 5-6 show a representative ketchup container that may be blow molded from a five-layer preform similar to that of FIG. 2. Again, the details of the preform and container construction are not critical, and variations may be required to the preform construction in order to blow mold the container of FIG. 5. The ketchup container 130 includes an open top end 131, neck finish 132 with neck flange 133, a shoulder portion 134 increasing in diameter, and a panel portion 135 connecting to a base 136. The five-layer sidewall construction, as shown in FIG. 6, includes an inner layer 137, first intermediate layer 138, core layer 139, second intermediate layer 140, and outer layer 141. By way of example, the inner and outer layers 137 and 141 may be virgin bottle grade PET, the core layer may be the blend composition of the present invention, and the intermediate layers 138 and 140 may be a PC-PET material or a high oxygen barrier material such as EVOH.

Several different methods are practiced to make the containers of the present invention.

In one method, a multilayered container is prepared by: (i) providing a core layer blend material of the present invention; (ii) providing an inner and outer layer material of a suitable formable polymer; (iii) co-injecting the core layer blend material and the inner and outer layer materials to form a multilayered preform; and (iv) heating and expanding the preform to form a container.

In an alternative method, a multilayered container is prepared by: (i) providing a core layer blend material of the present invention; (ii) providing an inner and outer layer material of a suitable formable polymer; (iii) extruding a multilayer parison tube having inner and outer layers of a suitable formable polymer and a core layer blend material of the present invention; (iv) clamping the parison tube into a hollow cavity mold; (v) blowing the parison against the cavity; and (vi) trimming the molded container.

The following examples are offered to aid in understanding of the present invention and are not to be construed as limiting the scope thereof. Unless otherwise indicated, all parts and percentages are by weight.

EXAMPLES

Examples 1-8

Examples 1-8 illustrate the barrier properties of various multilayer containers. Ten-ounce (295 ml) carbonated soft drink (CSD) preforms were coinjected in an Arburg press fitted with a Kortec coinjection unit and stretch blowmolded in a Sidel blowmolding unit.

For the core layer of the preforms, the materials listed in Table 1 were blended at 250-265° C. at 100 rpm in a twin screw extruder model ZSK-25 manufactured by the Werner and Pfleiderer Corporation and pelletized under air cooling. For each formula, approximately 4.5 to 6.8 kg of resin was blended. The PET and EVOH materials used were dried prior to use in a Conair drier at 121° C., in a vacuum oven at 110-120° C., or used as supplied in predried form in moisture-tight bags.

Twenty to fifty preforms were injected and stretch blow-molded. Each preform had a core layer of the composition described in Table 1 and an inner and an outer layer of PET. The thickness of the core layer was about 5% of the total container wall thickness of 0.051 cm.

Examples C1 and C2 were included for comparison purposes.

TABLE 1

Composition of Materials

| Ex. # | PET[1,2] wt. % | EVOH[3] wt. % | Bynel 4006[4] wt. % | Bynel 4104[5] wt. % | Bynel 4140[6] wt. % | Grivory[7] wt. % | Clarifier[8] wt. % | Antioxidant[9] wt. % |
|---|---|---|---|---|---|---|---|---|
| 1 | 44.95 | 53.95 | 1.00 | | | | | 0.10 |
| 2 | 59.95 | 29.95 | | 10.00 | | | | 0.10 |
| 3 | 51.95 | 29.95 | | | 18.00 | | | 0.10 |
| 4 | 64.95 | 29.95 | | | 5.00 | | | 0.10 |
| 5 | 44.95 | 49.95 | | | 5.00 | | | 0.10 |
| 6 | 48.62 | 50.52 | | | | | 0.76 | 0.10 |
| 7 | 40.92 | 48.98 | | | | 10.00 | | 0.10 |
| 8 | 47.45 | 52.45 | | | | | | 0.10 |
| C1 | 100.00 | | | | | | | |
| C2 | | 100.00 | | | | | | |

[1]For Examples 1-7 Eastapak 9663 PET was used as supplied by Eastman Chemical.
[2]For Example 8, a reduced crystallinity grade of PET was used as supplied by Eastman Chemical.
[3]EP104FBW EVOH was used as supplied by Eval Company of America.
[4]Bynel 4006 grade HDPE was used as supplied by DuPont.
[5]Bynel 4104 grade HDPE was used as supplied by DuPont.
[6]Bynel 4140 grade HDPE was used as supplied by DuPont.
[7]Grivory grade G21 Polyamide was used as supplied by EMS Chemie.
[8]Millad 3988 was used as supplied by Milliken Chemical.
[9]Irganox HP2215FF was used as supplied by Ciba Specialty Chemicals.

$CO_2$ transmission measurements were performed on a computer controlled pressure measurement system. The bottles were threaded into a gas manifold and charged with 4 atmospheres of $CO_2$ gas and maintained at ambient temperature and humidity for the 7½-week period. Each bottle under test is monitored with an independent pressure transducer, and the pressure is periodically measured and recorded by an automated data acquisition program.

$O_2$ transmission measurements were performed on a Mocon Oxtran 2/20 Model ML and SM that was adapted for use with 10 oz (295 ml) bottles, and were carried out at ambient temperature and humidity. Bottles were conditioned for 24 to 48 hours prior to each measurement.

TABLE 2

Permeability - 10 oz containers

| Example | % $CO_2$ Loss | $O_2$ Transmission (cc/pkg/day) |
|---|---|---|
| 1 | 6.6 | 0.0037 |
| 2 | 12.3 | 0.0185 |
| 3 | 12.6 | 0.0236 |
| 4 | 9.9 | 0.0135 |
| 5 | 7.2 | 0.0069 |
| 6 | 10.1 | 0.0090 |
| 7 | 10.0 | 0.0026 |
| 8 | 12.1 | 0.0123 |
| C1 | 24.7 | 0.0296 |
| C2 | 5.7 | 0.0030 |

As evident from the data in Table 2, the blends exhibited both $O_2$ and $CO_2$ barrier performance that was significantly higher than would have been expected based upon the proportion of EVOH alone. In the case of Example 1, the $O_2$ permeability differed from the neat barrier material by 19 percent, whereas the proportion of EVOH differed by a factor of about 2.

Having thus described the preferred the preferred embodiments of the present invention, those of skill in the art will readily appreciate that the teachings found herein may be applied to yet other embodiments within the scope of the claims hereto attached. The complete disclosure of all patents, patent documents, and publications are incorporated herein by reference as if individually incorporated.

What is claimed is:

1. A multilayered container, comprising:
   a layer of a formable polymer; and
   a layer of a composition comprising a blend of (i) between 30 and 70% by weight of a polyester material, (ii) between 25 to 54% by weight of a vinyl alcohol material, and (iii) between 0.5 and 25% by weight of a functionalized polyolefin material.

2. The container of claim 1, wherein the blend comprises between 25 and 50% by weight of the vinyl alcohol material.

3. The container of claim 1, wherein the polyester material is polyethylene terephthalate.

4. The container of claim 1, wherein the vinyl alcohol material comprises ethylene vinyl alcohol copolymer.

5. The container of claim 4, wherein the ethylene vinyl alcohol copolymer comprises between 25 and 50 mol % ethylene content.

6. The container of claim 1, wherein the vinyl alcohol material has a melt index between about 20 to 1.

7. The container of claim 1, wherein the polyester material is selected from the group consisting of PET, PC-PET, PETG, PEN, and PBT.

8. The container of claim 1, wherein the polyester material is PET having a viscosity average molecular weight between 36,000 and 103,000 Dalton.

9. The container of claim 1, wherein the container consists of a first layer of a formable polymer, a core layer of the blend, and a second layer of the formable polymer, wherein the formable polymer is PET, and wherein the container has a liquid capacity of 295 ml, a total wall thickness of 0.051 cm and the core layer is 5% of the total wall thickness of the container, and wherein the container exhibits less than 15% loss of $CO_2$ over a 7.5 week period.

10. The container of claim 1, wherein the container consists of a first layer of a formable polymer, a core layer of the blend, and a second layer of the formable polymer, wherein the formable polymer is PET, and wherein the container has a liquid capacity of 295 ml, a total wall thickness of 0.051 cm and the core layer is 5% of the total wall thickness of the container, and wherein the container exhibits less than 0.02 cc/pkg/day transmission of $O_2$.

11. The container of claim 1, wherein the blend further comprises an amorphous polyamide.

12. The container or claim 11, further comprising an oxygen scavenging material.

13. The container of claim 12, wherein the oxygen scavenging material forms active metal complexes having capacity to bond with oxygen for conferring high oxygen barrier properties to the composition.

14. The container of claim 12, wherein the oxygen scavenging material comprises cobalt.

15. The container of claim 12, wherein the oxygen scavenging material comprises mixed metal nanoparticles.

16. The container of claim 12, wherein the polyamide is a copolyamide comprising linear aliphatic units and aromatic components.

17. A multilayered container, comprising:
   a layer of formable polymer; and
   a layer of a composition comprising a blend of (i) between 30 and 70% by weight of a polyester material, (ii) between 25 and 54% by weight of a vinyl alcohol material, and (iii) between 1 and 10% by weight of a functionalized polyolefin material.

18. The container of claim 17, wherein the functionalized polyolefin material comprises maleic anhydride functionality.

19. The container of claim 17, wherein the blend further comprises an amorphous polyamide.

20. The container of claim 19, wherein the polyamide is a copolyamide comprising linear aliphatic units and aromatic components.

21. The container of claim 17, wherein the blend comprises between 25 and 50% by weight of the vinyl alcohol material.

22. The container of claim 17, wherein the vinyl alcohol material comprises ethylene vinyl alcohol copolymer.

23. A container having a hollow plastic multilayer body, including:
   a core layer comprising the composition of claim 1; and
   inner and outer layers of a formable polymer.

24. The container of claim 23, wherein the core layer has a thickness of between about 2 and 8 percent of the total wall thickness.

25. The container of claim 24, wherein the inner and outer layers comprise virgin PET and further comprising inner and outer intermediate layers of a polymer selected form the group consisting of EVOH, PEN, PVDC, nylon 6, MD-6, LCP, amorphous nylon, PAN, SAN, and AMOSORB and PC-PET.

26. A preform for expansion into a hollow plastic container body, the perform having a multilayered body-forming portion including:
   a core layer comprising the composition of claim 1; and
   inner and outer layers of a formable polymer composition.

27. The preform of claim 26, wherein the formable polymer composition comprises polyethylene terephthalate.

28. The preform of claim 26, wherein the preform has been expanded into a hollow plastic container body.

29. The expanded preform of claim 28, wherein the core layer has an average thickness of between 1 and 10 percent of the overall thickness of the body.

* * * * *